UNITED STATES PATENT OFFICE.

CLEMMONS PARRISH, OF PHILADELPHIA, PENNSYLVANIA.

EFFERVESCING PHOSPHATED TONIC BEVERAGE.

SPECIFICATION forming part of Letters Patent No. 240,759, dated April 26, 1881.

Application filed March 29, 1881. (No specimens.)

*To all whom it may concern:*

Be it known that I, CLEMMONS PARRISH, a citizen of the United States, residing at Philadelphia, Pennsylvania, have invented new and useful Improvements in Tonic Beverage, of which the following is a specification.

My invention consists of an effervescing phosphated iron-tonic beverage, flavored and colored, and bottled and securely corked, compounded and prepared as hereinafter specially set forth.

I take, first, the essential iron and phosphate elements of what is known in medicine as "Parrish's Chemical Food," invented by Edward Parrish, and fully described in "Parrish's Pharmacy," third edition, page 425, as "Parrish's Compound Syrup of Phosphates," and embodying the following ingredients, to wit: phosphate of iron, phosphate of soda, phosphate of lime, phosphate of potassa, with free phosphoric acid, which I place in a bottle. I then add a suitable coloring-matter, preferably such as will produce a pale straw color, and any desirable flavoring extract. I then fill the bottle with aerated or carbonated water, after which I tightly and securely cork the same, and set it away in a warm room, and occasionally subject it to slight agitation, to effect the proper aging and change, whereby a portion of the phosphate of iron is converted into tannate of iron, which aids in materially modifying the flavor, producing a peculiar ferruginous taste and also softening or toning of the color. The aging process which takes place in the tightly-corked bottle causes the carbonated mixture to become modified, losing its harshness and extreme pungency by assimilation of the carbonic acid with the salts of the other ingredients, thus forming a new and distinct compound.

The proportions used to produce the best results I have found to be about one part of the Parrish's Chemical Food to twelve parts aerated or carbonated water, with sufficient coloring and flavoring matter to render the mixture palatable and properly colored.

It is essentially necessary that the mixture should be tightly and securely corked, as very important results ensue which will not take place in an open vessel.

While I have described the steps involved in the mixing in the order specified, they may be varied without departing from the spirit of my invention, the gist of which rests in the idea of bringing into intimate contact the ingredients named in a closely-corked bottle, and permitting the same to become modified by time and occasional agitation in a warm room, producing an exceedingly palatable and healthy effervescing phosphated iron-tonic beverage.

What I claim as new, and desire to secure by Letters Patent, is—

The beverage herein described, consisting of the phosphate and iron elements of Parrish's Chemical Food, aerated or carbonated water, and flavoring and coloring matter, in the proportions named, bottled, securely corked, and aged, substantially in the manner hereinbefore specifically set forth.

In testimony whereof I have hereunto set my hand and seal in the presence of two subscribing witnesses.

CLEMMONS PARRISH. [L. S.]

Witnesses:
ELLWOOD BONSALL,
WILLIAM T. GABELL.